UNITED STATES PATENT OFFICE.

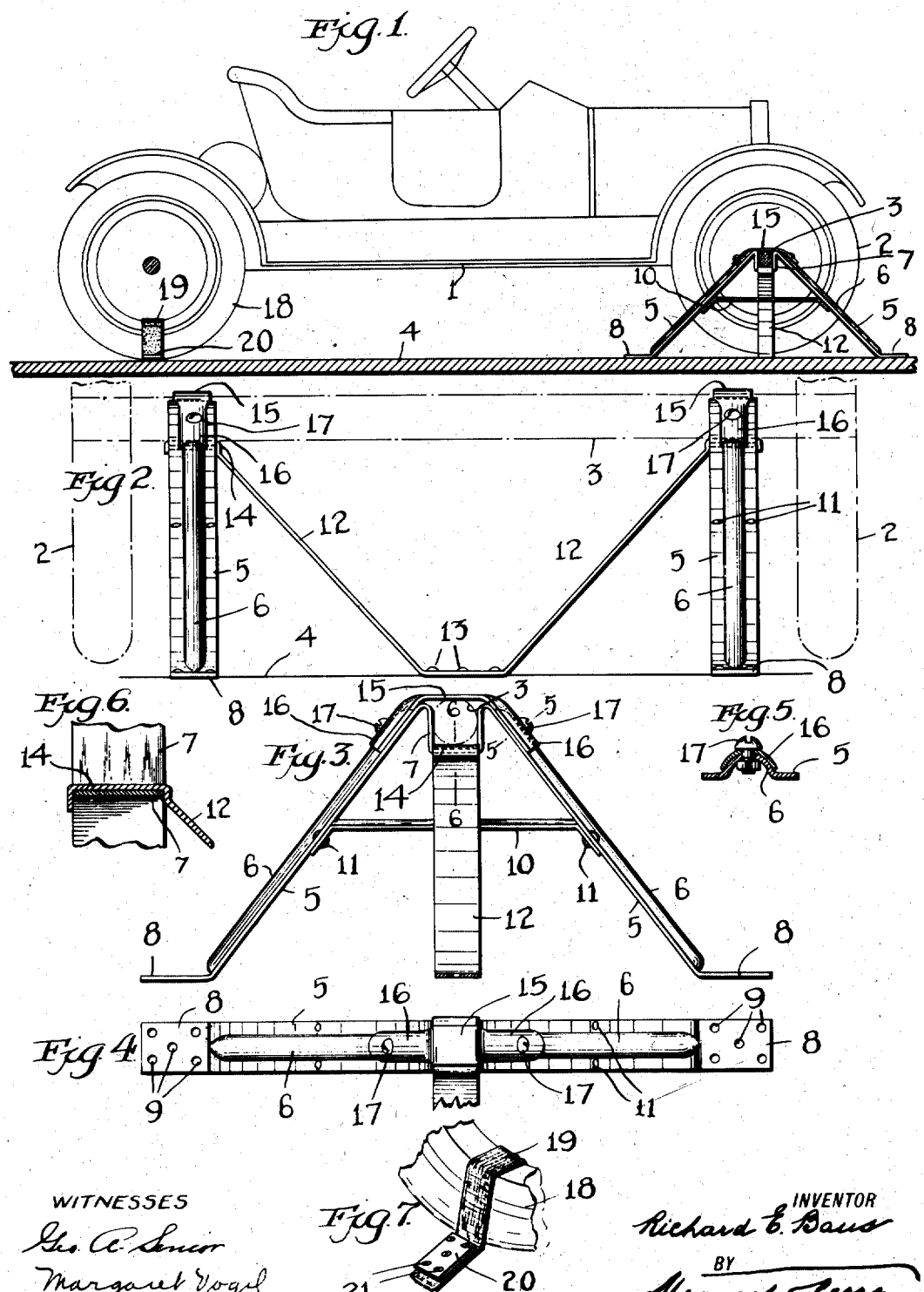
R. E. BAUS.
MOTOR VEHICLE SHIPPING DEVICE.
APPLICATION FILED SEPT. 4, 1915.
1,237,154.  Patented Aug. 14, 1917.

RICHARD E. BAUS, OF DETROIT, MICHIGAN, ASSIGNOR TO THE STUDEBAKER CORPORATION, A CORPORATION OF NEW JERSEY.

MOTOR-VEHICLE-SHIPPING DEVICE.

1,237,154.           Specification of Letters Patent.      Patented Aug. 14, 1917.

Application filed September 4, 1915. Serial No. 48,979.

*To all whom it may concern:*

Be it known that I, RICHARD E. BAUS, a citizen of the United States of America, and resident of Detroit, in the county of Wayne and State of Michigan, have invented certain new and useful Improvements in Motor-Vehicle-Shipping Devices, of which the following is a specification.

My invention relates to an improvement in devices adapted to be employed in connection with the shipping of motor vehicles as the same are transported in railroad cars.

Considerable difficulty has been encountered in devising means whereby an automobile may be securely held in position on the floor of a transporting car during transit. The vehicle with its accompanying engine is of great weight; hence the movement of the transporting car is liable to cause the automobile to be violently thrown from side to side or forward and backward as the case may be, according to the various shocks and strains imposed thereon, resulting where the automobile is not properly secured in serious damage thereto.

The object of my present invention is to provide means whereby the forward axle of the automobile may be supported and firmly locked to the floor of the car in a way to resist the strains above referred to. It will be understood that the forward axle bears the greatest weight due to the presence of the motor adjacent thereto. It is therefore desirable to fix this axle in a permanent position and at the same time to relieve the tires from the weight carried thereby and to lift the same clear of the floor of the car. This is not so important with reference to the rear wheels, for the reason that the weight carried thereby is much less than the weight carried by the forward wheels, but it is important that they should be secured permanently to the floor, and I provide means for this purpose.

I have illustrated my invention in the accompanying drawings, referring to the parts by numerals and designating like parts by like numerals.

Figure 1 is a side elevation of an automobile body and frame, the near wheels and intervening parts are eliminated in this drawing and the far wheels and sections of the axle adjacent said wheels are shown. My supporting device is also shown in side elevation. Fig. 2 is a longitudinal elevation of my supporting device. Fig. 3 is a side elevation viewed perpendicular to the line 3. Fig. 4 is a plan of the same. Fig. 5 is a sectional detail taken on the lines 5—5 of Fig. 3. Fig. 6 is a sectional detail taken on the lines 6—6 of Fig. 6. Fig. 7 is a perspective view of the means employed to secure the rear wheels to the floor of the car.

1 indicates generally an automobile body and frame. 2—2 are the forward wheels and 3 the forward axle. 4 is the floor of a railroad car. The supporting member employed by me as a whole is exhibited in Figs. 2, 3 and 4. It is preferably formed of sheet steel suitably ribbed to give strength to the structure. It comprises in detail the following elements: 5—5 are arms radiating from a common center and ribbed as at 6. The metal is bent as at 7 to form a recess to receive the forward axle, and the arms 5—5 are provided with extensions as at 8 parallel with the floor of the car and provided with screw-holes as 8 by means of which it may be secured to such floor. Thus it will be seen that the structure as described forms with the plane of the floor a triangular figure with a recess at its apex to receive the axle. 10 is a brace interposed between the arms 5—5 and secured thereto by the screws 11. 12 is a brace interposed between the two supporting members. It is secured to the floor of the car by the screws 13 and provided with the hook members 14 which hook over the recess member 7. 15 is a band adapted to confine the axle 3 within the recess member 7. Its ends are extended as at 16 and secured to the arms 5—5 by the screws 17. 18 is one of the rear wheels, the other rear wheel not being shown. The means employed by me for binding these wheels to the floor of the car is exhibited in Fig. 7 wherein 19 is a flexible band and 20 a plate having the screws 21 by which the plate is secured to the floor with the band interposed between the plate and the floor.

The operation of this device is as follows: The supporting members are constructed of sufficient height to support the axle and lift the wheels clear of the floor. These members as exhibited in Fig. 2 are interposed between the forward axle and the floor, their mounting being perpendicular to the axis of the axle and intermediate the wheels and the frame. The ends 8 of the arms 5—5 are screwed to the floor of the car as through the screw-holes 9 and the band 15 overlies the axle lying within the recess 7, and is secured by the screws 17. The rear wheels are then secured to the floor of the car by means of the flexible band 19, plate 20 and screws 21.

The structure described operates to support the forward axle of the car lifting the wheels clear of the floor and its structure is such that it is calculated to resist the strains incident to transportation. The triangular form of the support presents a positive resistance to longitudinal movement and the brace interposed between the supporting members resists lateral strain. The anchoring of the rear wheels also coöperates in resisting displacement.

What I claim is:

1. A motor vehicle shipping device embodying a pair of coöperating standards, each of which comprises means for engaging a vehicle axle near one end thereof, and diverging legs on which the axle engaging means is mounted, said legs being secured to a supporting surface and being of sufficient length to maintain the wheels of said axle free from engagement with said surface, in combination with a tie member, the opposite ends of which engage with the standards near their apexes, said tie member being secured between its ends to the supporting surface whereby the standards are maintained in upstanding, spaced positions and shifting under lateral stress precluded.

2. A motor vehicle shipping device embodying a pair of coöperating standards, each of which embodies a socket adapted to detachably receive a vehicle axle, means for normally locking the axle in said socket, and diverging legs for the socket, which legs are secured to a supporting surface and are of sufficient length to support the axle with the corresponding wheels free from engagement with said surface, in combination with lateral braces secured to said standards at their apexes and to the supporting surface for maintaining the standards in upstanding position and precluding movement thereof under lateral stresses.

3. A motor vehicle shipping device embodying a pair of rigid coöperating standards, each of which embodies a socket adapted to detachably receive a vehicle axle, means for normally locking the axle in said socket, and diverging legs for the socket, which legs are secured to a supporting surface and are of sufficient length to support the axle with the corresponding wheels free from engagement with said surface, in combination with lateral braces detachably engaging with said standards and secured to the supporting surface for precluding lateral movement of the standards, said braces being maintained in engagement with the standards by the means which lock the axles in the sockets.

4. A standard embodying upwardly converging legs and provided at the apex formed between the upper ends of the legs with a reëntrant portion adapted to receive a vehicle axle, a lateral brace provided with a jaw to detachably engage with said reëntrant portion, and unitary means for simultaneously locking the axle and the jaw of the brace within the reëntrant portion of the standard.

5. A motor vehicle shipping device embodying a pair of coöperating standards, each of which embodies a socket adapted to detachably receive the front axle of a vehicle, means for normally locking the axle in said socket, and diverging legs for the socket, which legs are secured to a supporting surface and are of sufficient length to support the axle with the corresponding wheels free from engagement with said surface, whereby the forward part of the vehicle is supported against longitudinal or transverse movement, in combination with lateral braces secured to said standards and to the supporting surface for precluding lateral movement of the standards, and means for securing the rear wheels of the vehicle to the supporting surface and in engagement therewith to preclude lateral shifting of said wheels.

6. A standard embodying upwardly converging legs and provided at the apex formed between the upper ends of the legs with a reentrant portion adapted to receive the front axle of a vehicle, said legs being of sufficient length to support the axle with its wheels free from engagement with the supporting surface, a lateral brace provided with a jaw to detachably engage with said reëntrant portion, and unitary means for simultaneously locking the axle and the jaw of the brace within the reëntrant portion of the standard, whereby the forward part of the vehicle is supported against longitudinal or transverse movement, in combination with means for securing the rear wheels of the vehicle in engagement with the supporting surface against lateral shifting.

7. Means for sustaining a motor vehicle in fixed position during transportation, embodying the combination of means for binding the rear wheels of the vehicle to, and in contact with, a supporting surface, and means engaging with the front axle of the vehicle for supporting the forward portion of said vehicle with the front wheels thereof free from engagement with said supporting surface.

8. The combination with a freight car, of means for suspending an automobile therein, comprising a triangular brace member forming a triangular brace in both vertical and horizontal planes.

Signed by me at Detroit, Michigan, this 31st day of August, 1915.

RICHARD E. BAUS.

Witnesses:
R. E. SCRATTH,
ROY C. GAMBLE.